3,313,233
PROCESS OF LACQUERING PLANOGRAPHIC PRINTING PLATES
Fritz Uhlig and August Rebenstock, Wiesbaden-Biebrich, Germany, assignors, by mesne assignments, to Azoplate Corporation, Murray Hill, N.J.
No Drawing. Filed Dec. 6, 1962, Ser. No. 242,629
Claims priority, application Germany, Dec. 9, 1961, K 45,402, K 45,403
14 Claims. (Cl. 101—149.2)

Printing plates for use in planographic printing processes may be made by applying a solution of a light-sensitive substance to a support of metal, paper or synthetic plastic material, drying the coating, exposing it to light under a master, and developing it by dissolving away the image-free parts with a suitable solvent. The remaining image parts form an oleophilic stencil which, when inked up by hand or in a printing machine, accept ink, while the image-free parts are hydrophilic and repel printing ink. This process for the preparation of a printing plate has its disadvantages because the oleophilic stencil is, in some cases, very thin and can therefore easily be rubbed away and the length of printing run which can be obtained in such cases is not very great.

To obtain more efficient and longer-lasting printing plates, it is known to coat the printing plate after development with a lacquer or lacquer emulsion with a view to strengthening the printing areas of the plate, but the lacquers and lacquer emulsions which have hitherto been proposed for this purpose have certain disadvantages. The lacquers are often difficult to use, or do not adhere well enough to the stencil, or are too brittle or do not have adequate film-forming properties and therefore do not enable really long printing runs to be made. The lacquer emulsions often separate out in storage into aqueous and non-aqueous phases or the dyestuffs or synthetic resins which they contain settle on the bottom of the storage vessel. Furthermore, it is possible with emulsion lacquers to apply them free of streaks only to small-size printing plates.

The present invention provides a lacquer for planographic plates which eliminates these disadvantages. The lacquer according to the present invention contains, as a lacquer base, a resinous, water-insoluble, film-forming substance and exemplary of such substances are phenolic resins, epoxy resins, polymers of vinyl compounds with each other or with other polymerizable compounds, or resins containing acid groups, e.g. phthalic acid ester resins, maleinate resins and alkyd resins; colophony resins, and natural resins, e.g. shellac.

Among the phenolic resins which may be employed are novolaks, i.e. phenol-aldehyde resins which are soluble, fusible, synthetic resins produced from a phenol and an aldehyde, essentially having no methylol groups in the molecule and therefore incapable of condensing with other molecules of the resin on heating without the addition of hardening agents.

Condensation products of this kind are produced by the plastic manufacturers chiefly as phenol - formaldehyde resins. The phenol-formaldehyde resins are highly useful in the process of the invention. As the phenol component of the resins, other phenols than the phenol itself may be present in the resin, e.g. cresols, xylenols, carboxylic acids of phenols.

The proportion of resin in the lacquer ranges from 3 to about 20% by weight of the lacquer. Proportions from 5 to 10% by weight of resin have proved advantageous, although lower contents of resin are applicable. Proportions as small as 3% by weight and even smaller have given useful results. Higher proportions, i.e. of more than about 20% by weight, have shown disadvantages or even useless as with higher proportions of resins the lacquers more and more tend to place the resin also on those portions of the printing plate which bear no image and hence should remain free from such deposit of resin.

The lacquer base may also be the reaction product of a non-hardening phenol-formaldehyde resin and a halogenated carboxylic acid. The preparation of such modified novolaks is disclosed in German Patent 1,053,930. In these resins carboxymethylethers of phenol-aldehyde resins are present in the preparation of which hydroxyl groups of phenol-aldehyde condensation products have been etherified by chloroacetic acid. By varying the proportions of phenol-aldehyde resin and chloroacetic acid and observing suitable conditions under which the reaction is allowed to take place, the degree of etherification may be controlled. In general, 1 to 2 parts by weight of chloroacetic acid are reacted with 2 parts by weight of the phenol-aldehyde resin.

The lacquer of the present invention comprises the lacquer base in solution in a solvent mixture of one or more polyhydric aliphatic alcohols and one or more other organic solvents, the solvent mixture containing at least 40 percent by weight of a polyhydric aliphatic alcohol.

The presence in the lacquer of a dyestuff is not essential, but it is of advantage in practical use inasmuch as it enables those preparing and using the lacquered printing plate to better judge the quality of the printing image.

By the use of the lacquer of the invention, the printing stencil is increased in thickness and protected from mechanical wear. Printing runs achieved with printing plates so lacquered are considerably longer than those obtained with plates coated with the known lacquers or lacquer emulsions.

The following are examples of polyhydric aliphatic alcohols which may be used in the laquer according to the present invention: ethylene glycol, di-ethylene glycol, triethylene glycol and higher polyglycols, glycerin, 1,2,4-butantriol, 1,3-dihydroxy-propane and pentaerythritol. The polyhydric aliphatic alcohol, or the mixture of such alcohols, preferably constitutes 50–70% of the total weight of solvent. More than 80% by weight thereof are, in general, useless in view of the weak solubility of resins in solvents of the polyhydric alcohol type.

The following are examples of organic solvents which may constitute the remainder of the solvent: monohydric aliphatic alcohols such as methanol, ethanol, propanol, isopropanol, butanol and isobutanol; aliphatic ketones such as methyl isobutyl ketone, ethyl methyl ketone, methyl propyl ketone, di-isobutyl ketone, methyl amyl ketone, ethyl amyl ketone; esters such as amyl acetate, butyl acetate, methyl glycol acetate (acetic ester of glycol monomethyl ether), glycol acetate, cyclohexyl acetate, ethyl glycol acetate (acetic ester of glycol monoethyl ether); aliphatic alkoxy alcohols such as glycol monomethyl ether and glycol monoethyl ether; and cyclic ketones such as cyclohexanone and hydrogenated hydrocarbons such as tetrahydronaphthalene.

Sometimes, commercially available solvents contain minor proportions of water. The presence in the lacquers which are to be applied according to the invention, of minor proportions of water does not trouble.

The following are examples of dyestuffs, taken from the "Farbstofftabellen" of Schultz, 7th edition (Leipzig, 1932), vol. 1, which also may be included in the lacquer: Rhodamine B (No. 864, p. 365), Oil Red (No. 864, p. 365), Pure Blue (No. 816, p. 345), Victoria Pure Blue B (No. 822, p. 347), Fast Scarlet (No. 448, p. 185), Sudan Red (No. 976, p. 421), Nigrosine (No. 986, p. 428), Crystal Violet (No. 785, p. 330), and Methyl Violet (No. 783, p. 328). Suitably, the proportion of dyestuff, if present, should not be higher than 10% by weight of the resin, as an even higher proportion of dyestuff would not better enhance the visibility of the printing image.

The lacquer may include a plasticizer to provide a further increase in the film-forming properties thereof, e.g. phthalic acid diethyl ester or phthalic acid dimethyl ester. The proportion of plasticizer in the lacquer, if present, should not be higher than 30% by weight of the resin.

The lacquer according to the invention may be utilized as follows: a printing support, e.g. an aluminum foil, coated with a layer comprising a water-insoluble light-sensitive compound is exposed under a master and then treated with a suitable developer liquid to dissolve away the non-image parts of the coating. The excess developer liquid is doctored off or removed by rinsing with water. A suitable quantity of the lacquer is then poured onto the printing plate, which may be still moist or may have been dried, and is spread as evenly as possible over the entire surface of the plate. The lacquer dissolves the image stencil while the resin in the lacquer adheres firmly to the image parts of the surface of the printing support but remains non-adherent to the image-free parts. The printing plate is then cleaned with water and dried in a hot air current or in a drying cupboard.

When the lacquer is used for the preparation of printing plates from a presensitized plate or foil having a water-soluble light-sensitive coating, the procedure is simplified. The exposed plate or foil, if desired after a brief treatment with water, is treated with the lacquer, a suitable quantity of lacquer being applied to the image side of the plate and spread as evenly as possible over the entire surface until the image becomes visible. The non-image parts do not accept the lacquer. The printing plate is then ready for printing and gives a very long printing run.

The following are examples of lacquers according to the invention:

Example 1

| | Parts by weight |
|---|---|
| Cyclohexanone | 50 |
| Glycerin | 50 |
| Novolak resin | 5 |
| Crystal Violet dyestuff | 0.5 |

The novolak resin is a pure, non-hardening phenol-formaldehyde resin having a melting temperature range of 108 to 118° C.

Example 2

| | Parts by weight |
|---|---|
| Di-isobutylketone | 40 |
| Ethylene glycol | 60 |
| Novolak resin | 7 |
| Methyl Violet dyestuff | 0.5 |

Example 3

| | Parts by weight |
|---|---|
| Acetic ester of glycol monomethyl ether | 40 |
| Ethylene glycol | 60 |
| Novolak resin | 9 |

Example 4

| | Parts by weight |
|---|---|
| Cyclohexanone | 35 |
| Ethylene glycol | 65 |
| Novolak resin | 5 |
| Rhodamine B dyestuff | 0.5 |

Example 5

| | Parts by weight |
|---|---|
| Cyclohexanone | 40 |
| Ethylene glycol | 60 |
| Novolak resin | 5 |
| Oil Red dyestuff | 0.5 |

Example 6

| | Parts by weight |
|---|---|
| Glycol monoethyl ether | 35 |
| Ethylene glycol | 65 |
| Novolak resin | 5 |
| Victoria Pure Blue B dyestuff | 0.5 |

Example 7

| | Parts by weight |
|---|---|
| Butanol | 25 |
| Cyclohexanone | 25 |
| Glycerin | 50 |
| Novolak resin | 4 |
| Nigrosine dyestuff | 0.5 |

Example 8

| | Parts by weight |
|---|---|
| Acetic ester of glycol monomethyl ether | 25 |
| Isopropanol | 25 |
| Glycerin | 25 |
| Ethylene glycol | 25 |
| Phenol resin/chloroacetic acid reaction product | 5 |
| Crystal Violet dyestuff | 0.5 |

The phenol resin/chloroacetic acid reaction product is prepared as one of the resins A, B, C, and D which are described in Example 5 of German Patent No. 1,053,930 which reports on their preparation as follows:

*Resin A.*—At a temperature of 50° C., 100 g. of a finely pulverized Novolak (for example the product which is commercially available under the trademark "Alnovol 429 k") are slowly added to a solution of 36 g. commercial caustic soda and 500 cm.³ of water. When the Novolak is dissolved the solution is boiled and within about 20 minutes 125 g. of pulverized sodium chloroacetate are added and then the mixture is boiled for one and a half hour. If the mixture should occasionally become cloudy a clear solution is restored by the addition of a minimum quantity of caustic soda. The reaction mixture is then diluted with the double quantity of water at a temperature of 40° C. and then it is made weakly acid to Congo Red and hydrochloric acid (1:2). The resin which separates is filtered, thoroughly rinsed with water and dried at a temperature of 110° C. About 100 g. of a resin with 10 to 11% of carboxylic groups according to an etherification degree of 30 to 34% are obtained.

*Resin B.*—In a refluxed flask 115 g. of 2-methylphenol, 110 g. of Formalin (30 percent), 150 cm.³ of a common salt solution of 25 percent by weight, 2.5 g. of gum arabic, 50 cm.³ of 2-n. solution of caustic soda and 25 cm.³ of 2-n. ammonium hydroxide solution are boiled for one and a half hour. Then the reaction mixture is diluted with water, the solid resin which has been separated is pulverized, thoroughly rinsed with water and then dried at 130° C. 129 g. of 2-methylphenol-formaldehyde resin are obtained.

At a temperature of 50° C., 100 g. of 2-methylphenol-formaldehyde resin are added under stirring to a solution of 36 g. caustic soda and 500 cm.³ of water. The mixture is heated to 100° C. Then, within 15 minutes, 125 g. of sodium chloroacetate are added which in the beginning dissolve. Later on, a tough resin separates. Then, 100 cm.³ of 2-n. solution of caustic soda are added to the reaction mixture whereupon some parts of the resin dissolve and again the mixture is heated under stirring for 2 hours at 100° C. The reaction mixture which is cooled down to 60° C. is acidified with hydrochloric acid (1:2), the resin which separates off is sucked off, thoroughly rinsed with water and dried at 130° C. 115 g. of a brown resin with a content of carboxylic groups of 13 g. COOH/100 g. is obtained.

*Resin C.*—54 g. of 2-methylphenol, 60 g. of furfurol, 1.2 g. of caustic soda and 5 cm.³ of water are heated under reflux for 2 and a half hours. The water is then evaporated at a pressure of 100 mm. and an outside temperature of 150 to 160° C. The reaction mixture is decanted several times. After drying, 62 g. of 2-methylphenol-furfurol resin are obtained. 39 g. of this resin are heated with 9 g. of caustic soda in 125 cm.³ of water to a temperature of 60° C. Under stirring and at a temperature of 100° C. 32 g. of sodium chloroacetate are added to the mixture and then the mixture is boiled for one and a half hour, then cooled down to 60° C. and acidified with hydrochloric acid (1:2). The resin which is separated off is decanted with hot water several times and dried at 130° C. The yield of the resulting etherification product is 40 g.

*Resin D.*—134.2 g. of 2,5-dimethylphenol, 110 cm.³ of Formalin (40 percent), 150 cm.³ of a 25 percent common salt solution, 2.5 g. of gum arabic, 50 cm.³ of 2-n. solution of caustic soda and 25 cm.³ of 2-n. ammonium hydroxide solution are heated for one and a half hour with reflux. The reaction product is poured into 2 l. of water, the solid resin which is separated is pulverized, thoroughly rinsed with water and dried at 130° C. 144.5 g. of 2,5-dimethylphenol-formaldehyde resin are obtained.

Of this resin, 113 g. are dissolved in a solution of 36 g. of caustic soda and 500 cm.³ of water at 60° C. Within 15 minutes, 125 g. of sodium chloroacetate are poured into the solution at a temperature of 110° C. Then the resin precipitates out. Slowly, 80 cm.³ of a 50 percent solution of caustic soda and 1000 cm.³ of water are added to the reaction mixture, the mixture is heated for thirty minutes to 100° C., cooled down to 60° C. and acidified with hydrochloric acid (1:2). The solid resin which separates is sucked off, thoroughly rinsed with water and dried at 130° C. 114 g. of yellow resin with a content of carboxylic groups of 4.5 g. COOH/100 g. are obtained.

Example 9

| | Parts by weight |
|---|---|
| Cyclohexanone | 25 |
| 1,2,4-butantriol | 25 |
| Novolak resin | 2.5 |
| Victoria Pure Blue B dyestuff | 0.3 |

Example 10

| | Parts by weight |
|---|---|
| Cyclohexanone | 25 |
| Pentaerythritol | 25 |
| Novolak resin | 2.5 |
| Fast Scarlet dyestuff | 0.3 |

Example 11

| | Parts by weight |
|---|---|
| Cyclohexanone | 25 |
| 1,3-dihydroxypropane | 25 |
| Phenol resin/chloroacetic acid reaction product | 2.5 |
| Sudan Red dyestuff | 0.4 |

Example 12

An aluminum foil is coated with a silicate layer, as described in German Patent No. 907,147, and then coated with a 1 percent aqueous solution of the borotetrafluoride salt of a diazo compound prepared from 1 mole of 4-diazo-diphenylamine and 1 mole of formaldehyde by condensation in sulfuric acid. After exposure under a photographic negative, e.g. for 1 minute to a 20-amp arc lamp, the plate is treated with a lacquer of the following composition:

| | Parts by weight |
|---|---|
| Methyl glycol acetate | 25 |
| Isopropanol | 25 |
| Glycerine | 25 |
| Ethylene glycol | 25 |
| Phenol resin | 5 |
| Crystal Violet dyestuff | 0.5 |

The phenol resin is a pure, non-hardening phenol-formaldehyde resin with a melting temperature range of 108° to 118° C. The dyestuff Crystal Violet is No. 785 on page 330 of "Farbstofftabellen."

A suitable quantity of the lacquer is applied to the image side of the printing plate and lightly spread over it with the aid of a sponge, swab, cellulose pad or the like as uniformly as possible until the lacquer base precipitates on the image parts and the image, colored by the dyestuff, becomes clearly visible. The unexposed parts of the light-sensitive coating are simultaneously dissolved away and the lacquer is not accepted by these parts of the plate, the polyhydric aliphatic alcohols in the lacquer tending to keep the non-image areas moist and water-acceptant.

Excess lacquer is removed and the plate is cleaned with a fresh moist swab of cotton or similar material and the printing plate is ready for printing. Very long runs can be obtained.

Example 13

A mechanically roughened aluminum foil is coated with a solution containing 1.0 part by weight of benzoquinone - (1,4) - diazide - (4) - 2 - sulfonic acid-β-naphthylamide. The coated foil is dried for a short time in a hot air current and then for one minute at 100° C. The light-sensitive, coated side is then exposed under a photographic negative, e.g. for one minute to a 20-amp arc lamp, and is then treated as in Example 12 with a lacquer of the following composition:

| | Parts by weight |
|---|---|
| Cyclohexanone | 50 |
| Glycerine | 50 |
| Phthalic acid ester resin | 5 |
| Methyl Violet dyestuff | 0.5 |

The phthalic acid ester resin is a fatty acid-free resin having a softening point of 75 to 90° C. and an acid number of 85 to 100. The dyestuff Methyl Violet is No. 783 on page 328 of "Farbstofftabellen."

Excess lacquer is removed and the whole image side of the printing plate is wiped over with a 1 percent phosphoric acid solution to increase the hydrophilic properties of the image-free parts. After this, printing can be carried out with good results.

Example 14

A commercially available paper sheet, prepared in accordance with U.S. Patent 2,534,588, which is very suitable for the preparation of printing plates, is coated with a 1 percent aqueous solution of a crude polycondensate from paraformaldehyde and diphenylamine-4-diazonium chloride with an addition of 0.2 percent by weight of 96 percent sulfuric acid. It is dried in the usual manner with hot air.

The crude polycondensate from paraformaldehyde and diphenylamine-4-diazonium chloride is prepared as follows: 3.3 parts by weight of paraformaldehyde and 23 parts by weight of diphenylamine-4-diazonium chloride are stirred at room temperature into 42 parts by weight of 85 percent phosphoric acid. A viscous solution is formed which is further stirred for half an hour at room temperature and then heated to 40° C. This temperature is maintained for an additional 24 hours, after which the reaction is completed.

After exposure under a negative, the sheet is treated as described in Example 12 with a lacquer of the following composition:

| | Parts by weight |
|---|---|
| Di-isobutyl ketone | 40 |
| Ethylene glycol | 60 |
| Maleinate resin | 5 |
| Victoria Pure Blue B dyestuff | 0.5 |

The maleinate resin contains colophony, melts between 110 and 115° C. and has an acid number of 210 to 240. The Victoria Blue B dyestuff is that described under No. 822, page 347, of "Farbstofftabellen."

Excess lacquer is removed with a moist sponge and printing in an offset machine can be effected.

*Example 15*

A superficially saponified cellulouse acetate foil is sensitized as described in Example 1 of German Patent 876,951, with a 3 percent aqueous solution of the zinc chloride salt of the diazo compound from the condensation product of 1 mole of diazo diphenylamine sulfate and one mole of paraformaldehyde in sulfuric acid. After drying, it is exposed under a master and treated as described in Example 12 with a lacquer of the following composition:

| | Parts by weight |
|---|---|
| Glycol monoethyl ether | 35 |
| Ethylene glycol | 65 |
| Phenol resin/chloroacetic acid reaction product | 4 |
| Sudan Red dyestuff | 0.5 |

The phenol resin/chloroacetic acid reaction product can be prepared as described in Example 8. The dyestuff Sudan Red is described in "Farbstofftabellen" under No. 976, page 421.

*Example 16*

An aluminum foil is used for making a printing plate as in the above Example 12 with the exception, however, that after exposure the plate is treated with a lacquer of the following composition:

| | Parts by weight |
|---|---|
| Ethyl glycol acetate | 25 |
| Isopropanol | 25 |
| Glycerine | 25 |
| Ethylene glycol | 25 |
| Phenol resin/chloroacetic acid reaction product as in Example 8 | 5 |
| Water | 10 |
| Crystal Violet dyestuff | 0.5 |

What is claimed is:

1. A process for improving a planographic printing plate having a hydrophilic support and a light-exposed layer thereon consisting essentially of a diazo compound and containing image-free areas and oleophilic image areas, which process comprises treating the layer with a lacquer comprising about 3 to 20 percent by weight, based on the weight of the lacquer, of a resinous, water-insoluble, oleophilic film-forming substance in solution in a solvent mixture capable of dissolving the image-free areas of the layer and containing about 40 to 80 percent by weight, based on the weight of the solvent mixture, of a polyhydric aliphatic alcohol, whereby the resinous substance adheres to the image areas, the solvent mixture removes the image-free areas of the layer, and the polyhydric alcohol maintains the support hydrophilic in the image-free areas.

2. A process according to claim 1 in which the substance is a phenolic resin.
3. A process according to claim 1 in which the substance is a phenol-formaldehyde resin.
4. A process according to claim 1 in which the substance is a reaction product of a non-hardening phenol-formaldehyde resin and a halogenated carboxylic acid.
5. A process according to claim 1 in which the substance is a phthalic acid ester resin.
6. A process according to claim 1 in which the substance is a maleinate resin.
7. A process according to claim 1 in which the lacquer also contains a dyestuff.
8. A process for improving a planographic printing plate having a hydrophilic support and a light-exposed layer thereon containing image-free areas and oleophilic image areas, which process comprises developing the light-exposed layer by removing the image-free areas thereof and applying directly to the surface of the developed plate a lacquer comprising about 3 to 20 percent by weight, based on the weight of the lacquer, of a resinous, water-insoluble, oleophilic film-forming substance in solution in a solvent mixture containing about 40 to 80 percent by weight, based on the weight of the solvent mixture, of a polyhydric aliphatic alcohol, whereby the resinous substance adheres to the image areas and the polyhydric alcohol maintains the support hydrophilic in the image-free areas.
9. A process according to claim 8 in which the substance is a phenolic resin.
10. A process according to claim 8 in which the substance is a phenol-formaldehyde resin.
11. A process according to claim 8 in which the substance is a reaction product of a non-hardening phenol-formaldehyde resin and a halogenated carboxylic acid.
12. A process according to claim 8 in which the substance is a phthalic acid ester resin.
13. A process according to claim 8 in which the substance is a maleinate resin.
14. A process according to claim 8 in which the lacquer also contains a dyestuff.

References Cited by the Examiner

UNITED STATES PATENTS

| 1,633,337 | 6/1927 | Lauter | 260—33.4 |
| 1,740,061 | 12/1929 | Beebe et al. | 101—149.2 |
| 1,951,943 | 3/1934 | Mossberg | 101—149.2 |
| 2,196,435 | 4/1940 | Belloc | 260—33.4 |
| 2,258,956 | 10/1941 | Misuraca | 101—149.2 |
| 2,483,468 | 10/1949 | Jones | 260—33.4 X |
| 2,537,531 | 1/1951 | Hoyt | 260—33.4 X |

DAVID KLEIN, *Primary Examiner.*

M. LIEBMAN, *Examiner.*

J. W. BEHRINGER, *Assistant Examiner.*